June 2, 1942. J. C. MORRELL 2,285,220
CONTAINER
Filed July 28, 1941 2 Sheets-Sheet 1
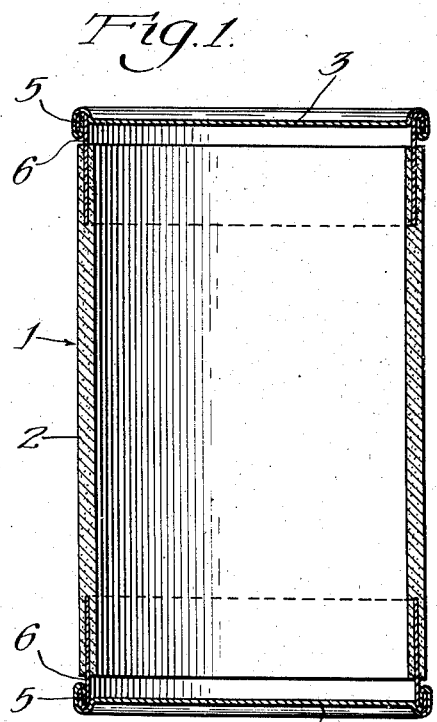
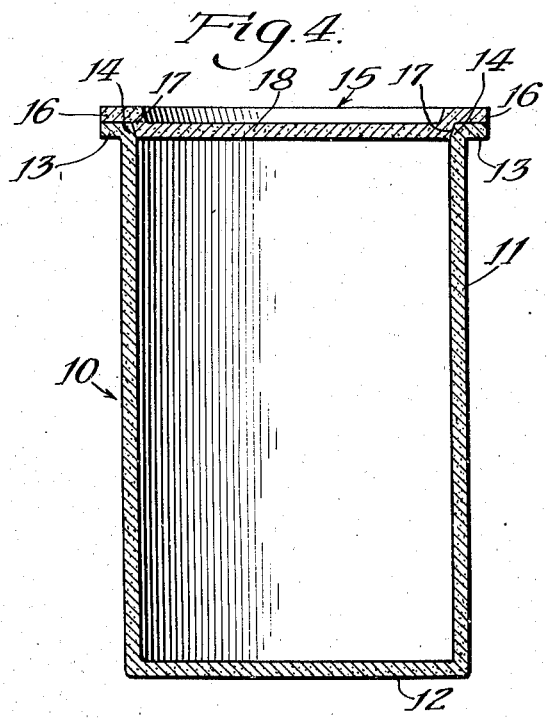
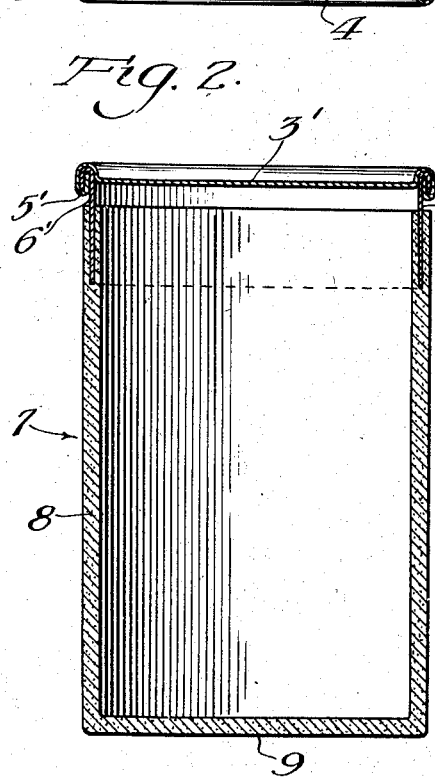
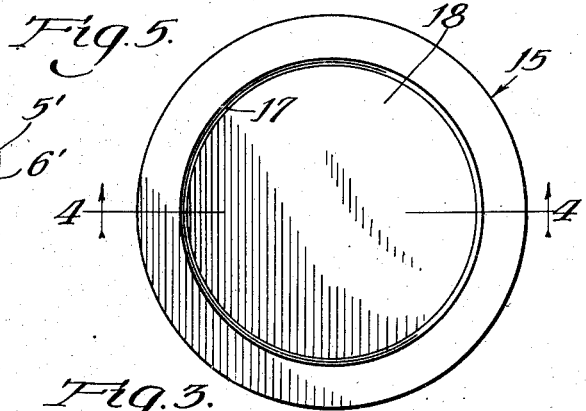
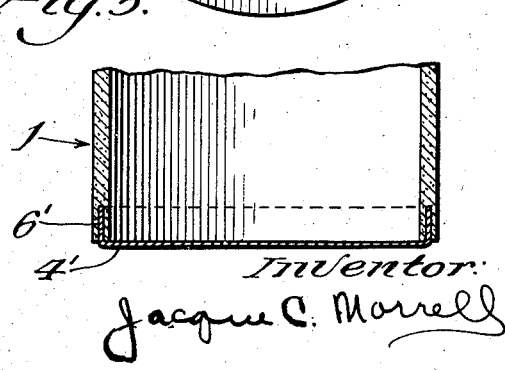

June 2, 1942. J. C. MORRELL 2,285,220
CONTAINER
Filed July 28, 1941 2 Sheets-Sheet 2
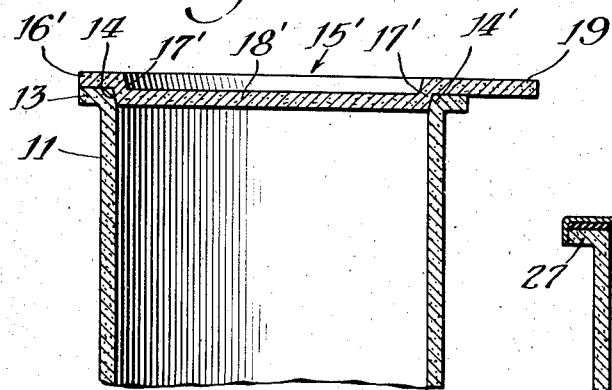
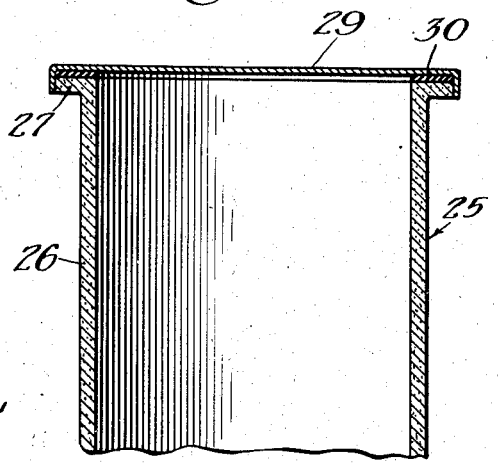
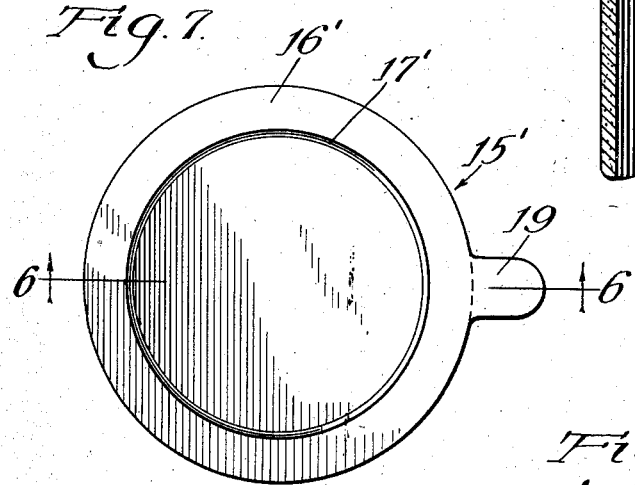
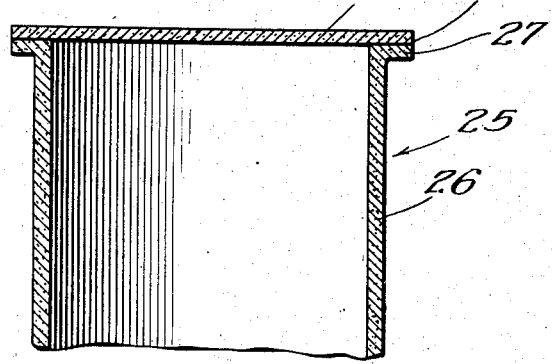
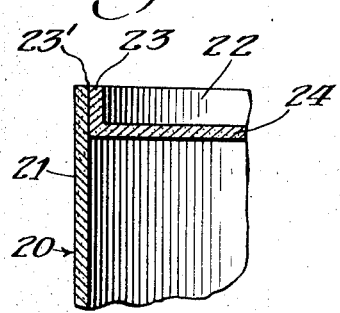
Inventor:
Jacque C. Morrell Patented June 2, 1942

2,285,220

UNITED STATES PATENT OFFICE 2,285,220

CONTAINER

Jacque C. Morrell, Oak Park, Ill.

Application July 28, 1941, Serial No. 404,373

3 Claims. (Cl. 229—3.5)

This application is a continuation-in-part of my application Serial No. 209,949 filed May 25, 1938. This invention relates to improvements in receptacles or containers and processes of making the same and refers particularly to receptacles, containers or cans for packaging solids, or liquids, or mixtures of the same, such as foodstuffs and perishables generally.

In the general embodiment of my invention the process comprises making a container of a synthetic resin or plastic material. In one aspect the container has a lateral wall with collars preferably of metal embedded in the thickness of the said wall and projecting from the opposite ends of the wall and securing the top and bottom of the container to the thus embedded collars. In another aspect the bottom of the container may be integral with the embedded collar and in still another modification the container is made up of a synthetic resin or plastic material and may have a bottom integral with the walls of the same and made of the same material as the lateral wall.

In still another modification of my invention the container or receptacle as well as the top may be made entirely of synthetic resin or plastic material preferably of a thermoplastic character in which the bottom is integral with the lateral wall of the container and the top is secured to the body of the container in one of several ways, e. g. by autogenous fusing which will be more particularly described hereinafter.

In one form of my invention, as stated in the aforementioned parent application Serial No. 209,949, molding may be employed with mixtures containing synthetic or other resins or plastic materials and fillers, preferably of a fibrous character as hereinafter described and may be applied to all shapes and forms, e. g., the cylinder or body of the container per se may be molded with the metal collars or ends in place or providing annular slots for the same.

In the same parent application it is further stated that I may employ molding mixtures containing synthetic or other resinous or plastic materials and fillers such as wood flour, mineral matter, etc., preferably employing fibrous materials such as paper fibers or pulp, cotton, jute, ramie, hemp and other natural fibers, artificial fibers such as rayon, mineral fibers such as asbestos and fibrous materials generally in admixture with the various plastic or resinous materials already mentioned, the preparations of fibrous and resinous materials being somewhat conventional, e. g., as one typical example may be mentioned 45 percent synthetic resin, 4 percent hardening agent, 1 percent lubricant, 0.5 percent dye or pigment, 48 percent long fiber asbestos. This, however, may vary to a fairly wide degree. These mixtures are molded by means well known to the art into cylindrical or other shapes with the metal collars or ends placed in position and sealed in the wall thickness and with sufficient protrusion from the body to provide attaching means for the metal tops and bottoms in the conventional manner as in the metal can or container industry.

Referring to the drawings:

Fig. 1 is a sectional elevational view of my improved container.

Fig. 2 is a sectional elevational view of another modification of my container.

Fig. 3 is a fragmentary sectional elevation of still another modification of the container.

Fig. 4 is a sectional elevation of the modification of my container which may be made entirely of plastic material with top taken along the line 4—4 of Fig. 5.

Fig. 5 is a plan view of the cover or top shown in Fig. 4.

Fig. 6 is a fragmentary sectional elevation of the type of container shown in Fig. 4 with modified top taken along the line 6—6 of Fig. 7.

Fig. 7 is a plan view of the modified top or cover shown in connection with the container in Fig. 6.

Fig. 8 is a fragmentary sectional view showing another method of securing the cover or top to the body of the container.

Fig. 9 is a fragmentary sectional elevation illustrating still another form of securing the cover to my improved plastic container.

Fig. 10 is a fragmentary sectional elevation of a plastic container with modified top or cover.

Referring in detail to the drawings, I indicates a container of the cylindrical type (which may be made by molding or extrusion) having cylindrical walls 2, top 3 and bottom 4. As a feature of my invention, the cylindrical lateral walls 2 of the container I and in general the body of the container, may be made of a mixture of synthetic resinous or generally plastic materials and a filler preferably of a fibrous character or in a non-equivalent modification of a thermoplastic synthetic resin without a filler. In the latter case the body of the container may be made by injection molding. Preferably, where the filler is employed a thermosetting synthetic resin is employed although the thermoplastic synthetic resin or plastic may also be employed with a filler. The top 3 and bottom 4 are preferably constructed of metal and are secured for example by crimping 5 onto cylindrical collars 6 which are embedded in the thickness of the walls 2, said collars projecting from the ends of the cylinder sufficiently to permit securement of the top and bottom.

Referring to Fig. 2, 1 is a container of the cylindrical type (which may be made by molding) with lateral walls 8 made of a synthetic resin integral with bottom 9 made of the same material as the walls 8 of the container. Preferably the container is made of a thermosetting resin when a filler is employed, and a thermoplastic synthetic resin or plastic material when the filler is not employed (in which case injection molding may be employed to form the body of the container) although the filler may be used with the thermoplastic synthetic resins or plastic if desired. The top 3' is preferably constructed of metal and is secured as by crimping 5' onto cylindrical metal collars 6' which are embedded in the thickness of the wall 7, said collars projecting from the ends of the cylinder sufficiently to permit securement of the top and bottom.

Fig. 3 shows a modification of my container similar to Fig. 1 wherein the container 1' has lateral walls made of a synthetic resinous or plastic material as described but in which the bottom 4' is integral with the collar 6', the latter being made up of metal. The top of this container may be secured to a metal collar embedded in the walls of the same as is illustrated in connection with Figs. 1 and 2.

Referring to Figs. 4 and 5, the container 10 is made up preferably of a thermoplastic material such as a synthetic resin containing a vinyl group or a cellulose derivative, the two groups being non-equivalent. The walls 11 of the container 10 are integral with the bottom 12 of the container and may be made of the same material by molding the thermoplastic materials preferably by the process known as injection molding. As a special feature the top part of the body of the container is shaped to form a flange 13 which may be beveled on the inside at 14 to conform to the top of the container. The top or cover 15 of the container shown in Fig. 4 is taken along the line 4—4 of Fig. 5 and has a companion flange 16 to conform to flange 13 on the body of the container and likewise a beveled surface 17 to conform to the beveled surface 14. The top 18 is depressed or otherwise shaped so that it fits part way inside the container. The top of the container is secured to the body of the container preferably by autogenously fusing or sealing the flanged members of the same by means of heat or by a solvent and heat although a suitable adhesive which is non-equivalent may be employed.

Fig. 6 is a modification of Fig. 4 wherein the container 10 with walls 11, flanges 13 and beveled portions 14 are similar to the corresponding parts of Fig. 4 and wherein the bottom not shown may be integral with the container. The top 15' of the container in Fig. 6 which is a section taken along the line 6—6 of Fig. 7 likewise has corresponding parts to the top 15 of the container 10 shown in Fig. 4, namely, flange 16', beveled surfaces 17' and depressed or shaped top 18'. The new feature in Figs. 6 and 7 when compared with Figs. 4 and 5 is the projection 19 of the flange 16', the purpose of which is to facilitate removal of the top or lid by forcing the same up, using a suitable instrument such as a can opener key, crown cap remover or other suitable device. This projection may be reinforced in metal. Fig. 8 illustrates another container 20 the walls 21 of which may be integral with the bottom as illustrated in Fig. 4 but is not shown in Fig. 8. This container equipped with a top 22 which has a vertical flange or collar member 23 integral with a horizontal or top member 24 and which may be secured to the lateral wall 21 by inserting the top inside the container and autogenously, welding or fusing the thermoplastic materials along the line and surface of contact 23' by the use of heat or a solvent and heat.

In Fig. 9 container 25 is made of a thermoplastic material such as a synthetic resin or a cellulose derivative (which materials are not equivalent) with walls 26 which may be integral with the bottom, not shown, and is likewise equipped with an integral flange 27 upon which may be fitted a top 28 which lies flat upon the flange 27 and may be secured thereto by autogenously sealing the thermoplastic materials of which the container is formed along the line and surface of contact by the use of heat and/or with a solvent. Fig. 10 shows a container 25 similar to that shown in Fig. 9 with walls 26 and integral bottom not shown and with flanges 27. This container may be sealed by the use of a metal cover 29 with rubber sealing rings or gaskets 30.

The metal bottom integral with collar shown in Fig. 3 may obviously be used although not preferably in the form shown in Figs. 4, 6, 8, 9 and 10.

It is also to be understood that the methods of sealing or fusing the tops on the containers shown in Figs. 4, 6, 8, 9 and 10 may also be used for sealing or fusing the bottoms on by making the top and bottom portions of the body of the container alike, e. g., flanging as shown in Figs. 4, 8 and 9. This will permit the use of tubular sections which may be made by extrusion instead of molding.

One of the characteristics of the forms of containers shown in Figs. 4, 6, 8, 9 and 10 is that the surface of contact between the top of the body of the container and the top is greater in width than the thickness of the lateral walls.

As a further development of detail to assist in securing the metal ends or collars in the walls of the container the portions of the metal ends which are embedded in the walls of the synthetic resin or plastic cylinder or body of the container may be perforated with smooth or with grater-like holes or the surfaces roughened to promote adhesion and cohesion and to facilitate fastening and sealing the metal ends with the body of the container.

Referring to the collars, which are preferably of metal, e. g., the usual tin plate or coated with some other protective material, they may be of a single piece, or joined by a crimped, curled, or plain lap seam, and soldered before or after placing in position or embedding in the walls of the container and the protruding ends may likewise be crimped or curled to permit attachment of the tops and bottoms in the conventional manner as employed in the metal can or container industry employing a rubber composition or other sealing material. It may be desirable in some cases to crimp the protruding ends after the collars have been embedded in the walls of the container. Also in some cases the bottom may be integral with the collar. In the methods described the protruding ends of the metal collars are preferably crimped or curled in such manner as to permit attachment of the top and bottom lids in the conventional and well known manner employed in the metal container or can industry.

These metal collars or ends may also be adapted to be opened like the usual "self opening" cans which have a relatively narrow strip integral with the metal collar or cylindrical portion or sides of the can at a point beneath the top or lid. In this case the strip would extend sufficiently out of the wall of the laminated body of the container to permit an outlining of the strip along its edges by lines which cut the surface of the metal and weaken the same so that the strip may be torn or sheared therefrom thus opening the can by removing the top and upper portion of the cylindrical side wall. The top lid in this case may be depressed to eliminate the otherwise vacant space in the container. Other alternatives of this idea may be employed such as a separate cylindrical piece or collar rolled into a bead provided in the side of the can, beneath the tearing strip, which extends to the lid or top and prevents solid material to be contained in the can from spilling when the tearing strip is removed. It is not desired to claim any particular design of tearing strip but merely to point out that it may be adapted to this new form of can or container.

The tops in Figs. 4 to 10 may be removed from the containers by forcing the same off such as has been described in connection with Figs. 6 and 7, or by outlining a section which may weaken it and permit it to be cut away or in any approved manner.

The thermosetting synthetic resins used herein described are those of the phenol formaldehyde, (including also cresols, xylenols, etc.), or urea-aldehyde types, which form infusible and insoluble resins on heat treatment. These are preferred when fillers are employed. They are converted into the infusible, insoluble types, and are quite resistant to temperatures required for treating packaged food materials to prevent spoilage such as in the canning of fruits, vegetables, meats, fish, etc. The thermoplastic types of synthetic resins and plastics may, however, be and are preferably employed when fillers are not used although it is to be understood that they may also be used with fillers.

Among the thermoplastic synthetic resins are the alkyd resins (glyptals made from polybasic acids such as phthalic and maleic acids and polyhydric alcohol, such as glycerols, glycols, etc.), styrene resins, e. g. the polystyrene types, acrylic or acrylate resins, e. g. methacrylate, the vinyl or vinylite polymer which may include acetate, halides, poly-vinyl alcohols plus aldehydes, etc. Resins with accompanying plasticizers if needed, such as tricresyl phthalates, etc., may be employed. Also the thermoplastics of the cellulose derivative type may be used in some cases, e. g., cellulose acetate and cellulose nitrate types, mixed esters such as cellulose acetate-butyrate, ethyl cellulose and similar materials. Various rubber or rubber like compositions may be used although not equivalent to the other plastics including synthetic rubbers, duprene, neoprene, thiokol, chlorinated rubber, and the like. The synthetic rubber may be a butadiene derivative or a copolymer with such materials as acrylonitrile, styrene, butylenes and the like. These rubber materials are not equivalent to the synthetic resins either of the thermosetting and thermoplastic types, the latter including synthetic resins and the cellulose derivatives. Also, they must preferably be vulcanized.

In general the preferred resin or plastics to be employed where fillers are not used and especially in connection with the forms of my invention shown in Figs. 4 to 10 inclusive (although they may also be used in connection with the modifications shown in Figs. 1 and 2) are the thermoplastic synthetic resins e. g. such as the vinyl types including polystyrenes. The vinyl including the polystyrene types are most preferred because they have high temperature softening points and are clear and colorless. (The vinyl or vinylite polymers may include acetate, halides, polyvinyl alcohols plus aldehydes, etc.) Other types of thermoplastic synthetic resins may however be employed, among which are the alkyd resins sometimes referred to as glyptals, which are made from polybasic acids such as phthalic and maleic acids and polyhidric alcohol, such as glycerol, glycols, etc., the acrylic ar acrylate resins, e. g. methacrylate. These types of resins in general have been classified under the heading of thermoplastic synthetic resins as distinguished from cellulose derivatives and natural resins. The thermosetting resins set or cure on the application of heat and do not soften appreciably when reheating. However, I may also employ nonequivalently as pointed out, some of the thermosetting resins, e. g. of the phenol-aldehyde or urea aldehyde types, especially when employing fillers.

A regrouping of the above types of thermoplastic synthetic resins might be shown as (a) styrenes, (b) vinyl resins, (c) alkyds, (d) acrylates. The polystyrenes are colorless, odorless, and tasteless, and are soluble in esters and chlorinated hydrocarbons and are compatible with such plasticizers as dibutyl and homologous phthalates and tricresyl and homologous phosphates. The vinyl resin plastics include, as stated, the polymers of the acetates and esters generally, ethers, halides, polyvinyl alcohols, acetals, and aldehydes, and one of the outstanding thermoplastic resins in this group is made by the copolymerization of vinyl chloride and vinyl acetate, referred to in the trade as vinylite.

The acrylate resins as well as the polystyrenes and vinyls are all characterized by the unsaturated radical $HC_2=CH-$ known as the vinyl radical, and in one sense therefore the three types belong to one large family, which may be referred to as the vinyl thermoplastic synthetic resins and may also include divinyl types, and serves to define the entire group.

The acrylates are produced by the polymerization of the monomeric derivatives of acrylic and methacrylic acids, esters, acrolein, aconitic acids and similar substances. The acrylates, which have good properties similar to the other two groups, are notable because of their light transmission properties. In general the vinyl thermoplastic synthetic resins are resistant to heat and water as well as generally to acids and alkalis.

The alkyd resins, which are produced from polybasic acids, such as stated above, phthalic and polyhydric alcohols, such as glycerol and which are also important from the viewpoint of thermoplastic synthetic resins, have been referred to above.

A recently developed type of thermoplastic synthetic resin which it is contemplated employing in connection with the present invention and which may be considered a vinyl derivative and in the vinyl group is the polymerized vinylidene chloride resin, i. e., polymers of vinylidene chloride or copolymers for example with vinyl chloride or similar compounds. These resins are resistant to acids and alkalis and generally to solvents, being soluble generally speaking only in the more active oxygen-containing organic solvents such as the oxides and ethers. Other types of thermoplastic synthetic resins may also be employed. Although not equivalent to the thermoplastic synthetic resins other plastic materials may in some cases be incorporated therewith in relatively minor amounts, e. g. natural rubbers, synthetic rubbers and other natural and synthetic plastics.

The solvents which may be employed with these materials when sealing the tops comprise generally the alcohols, ethers, ketones, aldehydes, esters or mixtures, in general relatively low boiling; also various hydrocarbons and derivatives. Among the solvents may be mentioned low boiling esters such as ethyl acetate, high boiling esters such as butyl and amyl acetates and propionates, ethyl and butyl lactates, trade solvents such as the cello-solves and carbitols, aromatic hydrocarbons such as benzene, toluene, xylenes, solvent naphtha, petroleum naphthas, alcohols from methyl to amyl and mixtures of these as well as others. The solvents are selected to suit the particular resin being sealed.

Resins with accompanying plasticizers such as tricresyl and homologous phthalates and dibutyl and homologous phthalates and the like may be employed for sealing the top. Other plasticizers, e. g., derivatives of glycerol and of dibasic and fatty acids, and a large group of substances may be used to soften and otherwise change the properties of the thermoplastic synthetic resins referred to and employed herein especially at the surfaces to be sealed. On the other hand, if desired, although not necessary, I may employ minor proportions of thermosetting resins and other suitable plastic materials to harden and raise the softening point of the thermoplastic synthetic resins employed by me. Mixtures of the latter among themselves may also be employed.

The thermoplastic synthetic resins are distinguished from the thermosetting types usually in being better in appearance, clearer, and in most cases colorless, and being more readily applied as well as having other desirable properties in connection with the present invention compared with the thermosetting types. The thermoplastic synthetic resin has the property of softening by reheating, whereas the thermosetting type sets or cures on the application of heat.

It is desirable to distinguish the class of resins which I employ in my invention and referred to as thermoplastic synthetic resins from the cellulose type of resin referred to generally as cellulose derivatives, such as the nitrate and acetate of cellulose. The cellulose types of resins are generally simple derivatives of cellulose itself, whereas the thermoplastic synthetic resins are polymers and/or condensed substances. The thermoplastic synthetic resins have the desirable property in connection with my invention of being water resistant in character as well as being resistant to the action of acids or acidic substances. The cellulose derivatives or cellulose plastics on the other hand are permeable to water in thin films and are destroyed or acted on by acids. It is therefore clear that there is a sharp line of demarcation and distinction in the use and definition of what I refer to as the thermoplastic synthetic resins comprising in general the vinyl group as the preferred members, e. g. polystyrene, polymerized vinyl esters and the like and acrylic resins and the alkyd resins and similar types as broadly defined above and in general which are substantially of a non-cellulose type on the one hand and the use of plastics made from cellulose or derivatives thereof on the other. These cellulose derivative thermoplastics, however, may be employed in connection with my invention.

I have already referred to the types of fillers which may be employed including various vegetable fibrous materials such as wood flour, cotton, etc. mineral fibers such as asbestos and mineral matter generally such as diatomaceous earth and the like.

It is also to be understood that I may use various coloring materials in connection with the various synthetic resins or plastics and these may be selected in accordance with well known practice for the selection of coloring materials which are compatible with various plastics. Also in connection with the use of solvents where these are employed with the thermoplastic synthetic resins to autogenously seal the tops into the body of the container, selections of solvents will be made in accordance with the resins employed, for example, the vinyl chloride resins are soluble in ketones and esters. The methacrylate resins are soluble in ketones, esters and aromatic hydrocarbons and the styrene resins are soluble in aromatic and chlorinated hydrocarbons. Small amounts of these solvents will permit cohesion of the top to the body of the container.

Several methods of forming have already been referred to and in general the methods employed are compression molding, injection molding and extrusion. These in general may be referred to as forming by compression. Where the metal collars are used they may be placed in the mold and sealed into the walls of the container during the molding operation. With thermoplastic synthetic resins and thermoplastic materials generally, such forms as are shown in Figs. 4 to 10 inclusive may be made by injection molding which is well known in the art of molding to permit a number of articles to be made at one time and this may be adapted to production in connection with my invention. Tubular forms of thermoplastic material may be made by extrusion and later flanged on both ends to permit attachments of top and bottom as shown by the top in Fig. 8.

While I have described a number of modifications and forms of my invention it is to be understood that the specific examples in respect of materials and details of process are given for illustrative purposes only and that many non-equivalent combinations may be employed within the broad spirit and scope of my invention.

I claim as my invention:

1. A container having a lateral wall, a metal top and a bottom comprising the end closures of said container, said wall consisting substantially wholly of a plastic material the opposite ends of said wall having a metal collar embedded therein and projecting therefrom, said top and bottom being secured to said respective collars by crimping said top and bottom upon the free end of said collars, said crimped portion being positioned wholly beyond the adjacent end of the well in non-embracing relation with respect to said wall, the plastic material in said wall functioning to seal said collars in said wall and said collars being held to said wall substantially solely by the embedded ends of the said collars.

2. A container having a lateral wall, a metal top and a bottom comprising the end closures of said container, said wall consisting substantially wholly of a plastic material, the opposite ends of said walls having a metal collar embedded therein and projecting therefrom, one closure being secured to one of said collars by crimping the same upon the free end of said collar, said crimped portion being positioned wholly beyond the adjacent end of the wall in non-embracing relation with respect to said wall and the opposite closure being formed integral with the collar embedded in the opposite end of said wall, the plastic in said wall functioning to seal said collars in said wall and said collars being held to said walls substantially solely by the embedded ends of the said collars.

3. A container formed of plastic material having lateral walls and one end closure integral therewith, the opposite end of said container having a metal collar embedded within the wall and projecting therefrom, said metal collar having a metal closure secured thereto by crimping the same upon the free end of said collar, said crimped portion being positioned wholly beyond the adjacent end of the wall in non-embracing relation with respect to said wall, the plastic material in said wall functioning to seal said collar in said wall and said collar being held to said wall substantially solely by the embedded end of the said collar.

JACQUE C. MORRELL.